United States Patent [19]

Klug

[11] Patent Number: 6,102,986
[45] Date of Patent: Aug. 15, 2000

[54] METHOD OF INHIBITING GAS HYDRATE FORMATION

[75] Inventor: Peter Klug, Grossostheim, Germany

[73] Assignee: CLARIANT GmbH, Frankfurt, Germany

[21] Appl. No.: 09/230,156

[22] PCT Filed: Jul. 17, 1997

[86] PCT No.: PCT/EP97/03831

§ 371 Date: Jan. 20, 1999

§ 102(e) Date: Jan. 20, 1999

[87] PCT Pub. No.: WO98/03615

PCT Pub. Date: Jan. 29, 1998

[30] Foreign Application Priority Data

Jul. 23, 1996 [DE] Germany .......................... 196 29 662

[51] Int. Cl.[7] ....................................... C07C 7/20
[52] U.S. Cl. .................... 95/153; 96/235; 585/15
[58] Field of Search ................. 95/153; 96/235, 96/FOR 118; 585/15, 950

[56] References Cited

U.S. PATENT DOCUMENTS

| 3,213,593 | 10/1965 | Hendrix | 95/153 |
|---|---|---|---|
| 4,973,775 | 11/1990 | Sugier et al. | 95/153 |
| 5,600,044 | 2/1997 | Colle et al. | 95/153 |
| 5,744,665 | 4/1998 | Costello et al. | 95/153 |
| 5,789,635 | 8/1998 | Durand et al. | 95/153 |
| 5,817,898 | 10/1998 | Delion et al. | 95/153 |
| 5,841,010 | 11/1998 | Rabeony et al. | 95/153 |
| 5,874,660 | 2/1999 | Colle et al. | 95/153 |
| 5,981,816 | 11/1999 | Sinquin et al. | 95/153 |

FOREIGN PATENT DOCUMENTS

| 2618876 | 2/1989 | France | 95/153 |

*Primary Examiner*—Duane S. Smith
*Attorney, Agent, or Firm*—Miles B. Dearth; Scott E. Hanf

[57] ABSTRACT

The present application relates to a method for inhibiting gas hydrate formation, which involves the addition to the aqueous phase, in the case of multiphase mixtures comprising water, gas and possibly condensate, of an amine oxide or salts thereof.

5 Claims, No Drawings

METHOD OF INHIBITING GAS HYDRATE FORMATION

BACKGROUND OF THE INVENTION

Gas hydrates are crystalline inclusion compounds of gas molecules in water, which form under certain temperature and pressure conditions (low temperature and high pressure). In the process, the water molecules form cage structures around the gas molecules in question. The lattice framework formed solely from water molecules is thermodynamically unstable, the lattice only being stabilized by the inclusion of gas molecules with the formation of an ice-like compound which, depending on the pressure and the gas composition, may exist even beyond the freezing point of water (up to above 25° C.). An overview of the subject of gas hydrates is provided by Sloan, Clathrate Hydrates of Natural Gases, M Dekker, New York, 1990.

Of particular importance in the petroleum and natural gas industry are those gas hydrates which form from water and the natural gas constituents methane, ethane, propane, isobutane, n-butane, nitrogen, carbon dioxide and hydrogen sulfide. Today's production of natural gas, in particular, is presented with a major problem by the existence of these gas hydrates, especially in those cases where wet gas or multiphase mixtures of water, gas and alkane mixtures are subjected to low temperatures and high pressure. In these conditions the formation of the gas hydrates, owing to their insolubility and crystalline structure, leads to blockages in transport facilities. These include pipelines, valves or production facilities in which wet gas or multiphase mixtures are transported over extended distances at low temperatures, as happens especially in colder regions of the earth or on the sea bed.

Given appropriate pressure and temperature conditions, gas hydrate formation may also present problems during drilling to develop new gas or petroleum reservoirs.

To avoid such problems, gas hydrate formation in gas pipelines or during the transport of multiphase mixtures may be suppressed by the use of relatively large amounts (double-figure percentages relative to the aqueous phase) of lower alcohols such as methanol, glycol or diethylene glycol. The addition of these additives has the effect of shifting the thermodynamic limit of gas hydrate formation to lower temperatures and higher pressures (thermodynamic inhibition). The addition of these thermodynamic inhibitors does, however, cause major safety problems (flash point and toxicity of the alcohols), logistics problems (large storage tanks, recycling of these solvents) and correspondingly high cost, especially in offshore production.

Attempts are therefore being made at present to replace thermodynamic inhibitors by the addition, in the temperature and pressure ranges within which gas hydrates are able to form, of additives (amount used <2%) which either delay gas hydrate formation (threshold hydrate inhibitors, kinetic inhibition) or cause gas hydrate agglomerates to be small and pumpable, so that they can be transported through a pipeline (so-called agglomerate inhibitors or anti-agglomerates).

The gas hydrate inhibitors described in the patent literature include not only the known thermodynamic inhibitors, but also a multiplicity of both monomeric and polymeric classes of substances which represent kinetic or agglomerate inhibitors. Patent Application WO 95/17579 describes quaternary ammonium compounds, especially those which carry butyl or pentyl groups on the quaternary center, as gas hydrate inhibitors. Mixtures of such quaternary ammonium salts with corrosion inhibitors and amidic polymers are mentioned in WO 96/04462. WO 96/08636 describes surface-active substances as gas hydrate inhibitors which carry a polar head group and a hydrophobic radical, the hydrophobic radical containing no more than 12 carbon atoms. Examples mentioned are sodium valerate, butanol, butyl sulfate and butylsulfonate, alkylpyrrolidones and a zwitterion of the formula $R_2N(CH_3)_2$—$(CH_2)_4SO_3$.

Many of these additives, however, have so far not been sufficiently effective or not been available in sufficient quantities or only at high prices, or are not toxicologically safe.

It is therefore an object of the present invention to find novel effective additives which retard the formation of gas hydrates (kinetic inhibitors) or keep the gas hydrate crystals small and pumpable (anti-agglomerates). These are intended to replace the thermodynamic inhibitors (methanol and glycols) still being used at present, which give rise to considerable problems in terms of safety and logistics, and are designed to represent a reduced potential hazard to the environment, compared with the quaternary ammonium salts used.

SUMMARY OF THE INVENTION

As has now been surprisingly found, amine oxides or their salts are particularly suitable as gas hydrate inhibitors. As shown in the appended Examples, they are capable, when added in small amounts, of effective suppression of the formation of gas hydrates. Furthermore, the especially effective amine oxides exhibit virtually no surfactant activity, which is particularly beneficial in terms of their foaming behavior, since standard surfactant additives often cause grave foaming problems.

The invention therefore relates to a method for inhibiting gas hydrate formation, which comprises the addition to the aqueous phase, in the case of multiphase mixtures (of gas, water and possibly condensate), of an amine oxide or salts thereof.

DETAILED DESCRIPTION OF THE INVENTION

The method according to the invention preferably employs amine oxides of the formula

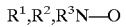

wherein $R^1$, $R^2$ and $R^3$, independently of one another, are $C_1$–$C_{30}$-alkyl, $C_2$–$C_{30}$-alkenyl, $C_7$–$C_{30}$-alkylaryl, $C_7$–$C_{30}$-arylalkyl or $C_6$–$C_{10}$-aryl, where the alkyl and alkenyl groups may be interrupted by —O—, —NHCO— or —O—CO— and may be substituted by hydroxyl groups, carbonyl groups, carbonamide groups or alkoxycarboxyl groups and two or three groups $R^1$, $R^2$ and $R^3$, together with the nitrogen atom to which they are bound may form a mono- or bicyclic ring having from 4 to 10 carbon atoms, where one such monocyclic ring may contain an oxygen atom instead of a —$CH_2$— unit.

Preference is given to the use of those amine oxides of the above formula, wherein $R^1$, $R^2$ and $R^3$, independently of one another, are $C_1$–$C_8$-alkyl or $C_2$–$C_8$-alkenyl which may be interrupted by oxygen atoms and may be substituted by hydroxyl groups, carboxyl groups, carbonamide groups or alkoxycarbonyl groups and two groups $R^1$, $R^2$ and $R^3$ may form a morpholine ring.

Particular preference is given to the use of those amine oxides of the above formula, wherein $R^1$, $R^2$ and $R^3$, independently of one another, are $C_3$–$C_5$-alkyl or $C_2$–$C_5$-hydroxylalkyl.

These amine oxides can also be used in the form of their acid addition salts of the formula $$R^1,R^2,R^3N^{\ominus}—OHX^{\ominus}$$

where X is the anion of a mineral acid, carboxylic acid or sulfonic acid. Examples of such anions are halide, sulfate, phosphate, nitrate and the anions of $C_1$–$C_{12}$-alkanoic acids such as formate, acetate, propionate, butyrate and isobutyrate, n-pentanoate, methylbutyrate, pivalate, octanoate and laurate.

The synthesis of the amine oxides is carried out according to methods known per se, preferentially by oxidation of the corresponding tertiary amine with peroxides or peracids, preferably by oxidation with hydrogen peroxide in aqueous or aqueous/alcoholic solution as shown e.g. in J. Am. Chem. Soc. 1957, 79, 964. Under these conditions a low-viscosity solution of the desired amine oxides in water or alcohol/water mixtures is produced directly. In principle, the products may also be employed as an anhydrous pure substance, but advantageously they are generally used in the form of an aqueous solution, to ensure convenient proportioning at low viscosity.

In petroleum and natural gas production, the amine oxides are added to the multiphase mixture of gas and water by means of standard equipment such as injection pumps or the like, the good water solubility of the amine oxides resulting in rapid and uniform distribution of the inhibitor in the aqueous phase which has a tendency to form hydrates. It is generally sufficient for the aqueous amine oxide solution to be added to ensure uniform distribution.

Since the inhibitor primarily retards or prevents the formation of gas hydrates, the addition of the inhibitor must take place before gas hydrates are formed, i.e. still above the equilibrium temperature of hydrate formation. That is generally the case if the inhibitor is added directly at the natural gas source.

The amine oxides can be employed on their own or in combination with other known gas hydrate inhibitors. In general, the amount of the novel gas hydrate inhibitors used will be sufficient to achieve adequate inhibition. Typical use concentrations, calculated as 100% of active substance, are from 0.01 to 2 wt %, especially concentrations of from 0.02 to 1 wt % (100–10,000 ppm), based on the aqueous phase.

Particular utility is also shown by mixtures of the amine oxides or amine oxide salts with one or more polymers having a carbon backbone obtained by polymerization, and amide bonds in the side chains. These include, in particular, polymers such as poly(vinylpyrrolidone), poly(vinylcaprolactam), copolymers from vinylpyrrolidone and vinylcaprolactam, and terpolymers of vinylpyrrolidone, vinylcaprolactam and further anionic, cationic and neutral comonomers having a vinylic double bond such as 1-olefin, N-alkylacrylamides, N-vinylacetamide, acrylamide, sodium 2-acrylamido-2-methyl-1-propanesulfonate (AMPS) or acrylic acid. Also suitable are mixtures with homo- and copolymers of N,N-dialkylacrylamides such as N-acryloylpyrrolidone, N-acryloylmorpholine and N-acryloylpiperidine. Likwise suitable are mixtures with alkylpolyglycosides, hydroxylethycellulose, carboxymethylcellulose and other ionic or nonionic surfactant molecules.

The efficacy of the novel amine oxides was studied by means of the THF hydrate test, which is also described in WO 95/17579 and WO 96/08636. Since natural gas hydrates exist only at high pressures, which are not readily accessible under laboratory conditions, the model used is the formation of clathrates from THF (tetrahydrofuran) and water. These hydrates form at atmospheric pressure at 4° C. with a molar water/THF ratio of 17:1. If an additive then exhibits the characteristic of kinetically inhibiting the formation of THF hydrates or of keeping the THF hydrates formed stirrable, this additive should have a similar effect on naturally occurring gas hydrates. As can be demonstrated in the experimental examples set forth below, THF hydrate formation commences rapidly without an inhibitor (Example 1) under the experimental conditions and leads to the formation of THF hydrates in the form of needles or flakes which very rapidly cause the entire test solution to solidify. The addition of an amine oxide or amine oxide salt (Examples 2–13) considerably slows down THF hydrate formation and/or modifies the crystal form of the hydrates produced.

All the amine oxides and amine oxide salts used slow down the formation of THF hydrate. Particularly good effects are shown by the more hydrophobic amine oxides such as tripropylamine oxide, tributylamine oxide and tripentylamine oxide.

The THF test was carried out as follows:

EXAMPLE 1 (experiment without inhibitor)

A short Pasteur pipette (l=140 mm) is mounted in such a way in a pierced cork stopper, that the pipette tip projects from the cork stopper by 120 mm. Then a drop of a THF/water mixture (1:17) is drawn up into this pipette by means of the capillary effect, the pipette (with the cork stopper) is tared and cooled at −20° C. for at least 2 h. A 3.5% strength sodium chloride solution is mixed with THF in a ratio of 4:1. 30 ml of this solution are introduced into a test tube (150×30 mm) and thermostated in a cooling bath at 0° C. for 25 min (depth of immersion of the test tube in the cooling bath about 60 mm).

The frozen pipette is taken from the refrigerator, quickly wiped (to remove crystal nuclei on the outside of the pipette and thus obtain uniform starting conditions) and immediately immersed to a depth of about 15 mm into the above THF/water/sodium chloride mixture, THF hydrates forming after a short time (a few minutes).

After 5–15 min the pipette is very carefully withdrawn from the test tube and the pipette with the cork stopper and adhering hydrates is immediately tared. Based on the difference between the original weight and the weight at this point and on the time elapsed, the growth rate of THF hydrate formation is calculated (in g/h).

EXAMPLES 2–13

The same procedure is followed as in Example 1, except that the test solution has 5000 ppm of the corresponding inhibitor added to it. The crystal growth time is increased from 5 min to, if necessary, 1 h if no rapid hydrate growth is observed. The evaluation is carried out as above. The crystal form of the hydrates formed is noted.

The results are summarized in Table 1 and show the efficacy of the amine oxides.

TABLE 1

THF test, hydrate growth rates

| Ex. | Inhibitor | Growth rate (g/h) | Appearance of the hydrate crystals |
|---|---|---|---|
| 1 | without | 4.05 | needles + flakes |
| 2 | trimethylamine oxide | 1.37 | flakes |
| 3 | tri-n-propylamine oxide | 0.55 | flakes |

TABLE 1-continued

THF test, hydrate growth rates

| Ex. | Inhibitor | Growth rate (g/h) | Appearance of the hydrate crystals |
|---|---|---|---|
| 4 | triisopropanolamine N-oxide | 1.13 | flakes |
| 5 | di-n-butylhydroxylethyl-amine oxide | 0.62 | needles + flakes |
| 6 | tri-n-butylamine oxide | <0.01 | no hydrate growth |
| 7 | tri-n-pentylamine oxide | <0.01 | no hydrate growth |
| 8 | di-n-octylmethylamine oxide | 0.99 | needles + flakes |
| 9 | cocoyldimethylamine oxide | 1.24 | needles + flakes |
| 10 | bis-(hydroxylethyl)cocoyl-amine oxide | 0.97 | needles + flakes |
| 11 | coconut fatty acid dimethyl-3-aminopropyl amide N-oxide | 1.07 | flakes |
| 12 | N-methylmorpholine N-oxide | 0.95 | flakes |
| 13 | tri-n-butylamine oxide propionate | 0.06 | needles |

These amine oxides were prepared in accordance with the following general procedure: 0.50 mol of the corresponding tertiary amine was dissolved in 150 ml of isopropanol, and 1.50 mol of 35% strength aqueous hydrogen peroxide were added dropwise within 30 min. In the case of water-insoluble amines (tributylamine, tripentylamine) the reaction mixture then consists of two phases. This was followed by vigorous stirring at 25° C. for about 2–30 h (depending on the water solubility of the amine), a single-phase clear solution of the amine oxide in water being formed which, after the reaction was complete, no longer produced a purple color with phenolphthalein. Finally, to destroy the excess hydrogen peroxide, the mixture was heated for 2 h to 60–80° C. This resulted in an aqueous isopropanolic solution of the corresponding amine oxide.

What is claimed is:

1. A method for inhibiting gas hydrate formation, which comprises the addition to the aqueous phase of multiphase mixtures of an amine oxide or salts thereof.

2. A method as claimed in claim 1, which comprises the addition of an amine oxide of the formula $$R^1, R^2, R^3 N\text{---}O$$

wherein $R^1$, $R^2$ and $R^3$, independently of one another, are $C_1$–$C_{30}$-alkyl, $C_2$–$C_{30}$-alkenyl, $C_7$–$C_{30}$-alkylaryl, $C_7$–$C_{30}$-arylalkyl or $C_6$–$C_{10}$-aryl, where the alkyl and alkenyl groups may be interrupted by —O—, —NHCO— or —O—CO— and may be substituted by hydroxyl groups, carbonyl groups, carbonamide groups or alkoxycarboxyl groups and two or three groups $R^1$, $R^2$ and $R^3$, together with the nitrogen atom to which they are bound may form a mono- or bicyclic ring having from 4 to 10 carbons atoms, where one such monocyclic ring may contain an oxygen atom instead of a —CH$_2$— unit.

3. A method as claimed in claim 1, which comprises the addition of an amine oxide of the formula $$R^1, R^2, R^3 N\text{---}O$$

wherein $R^1$, $R^2$ and $R^3$, independently of one another, are $C_1$–$C_8$-alkyl or $C_2$–$C_8$-alkenyl which may be interrupted by oxygen atoms and may be substituted by hydroxyl groups, carboxyl groups, carbonamide groups or alkoxycarbonyl groups and two groups $R^1$, $R^2$ and $R^3$ may form a morpholine ring.

4. A method as claimed in claim 1, which comprises the addition of an amine oxide of the formula $$R^1, R^2, R^3 N\text{---}O$$

wherein $R^1$, $R^2$ and $R^3$, independently of one another, are $C_3$–$C_5$-alkyl or $C_2$–$C_5$-hydroxylalkyl.

5. The method as claimed in claim 1, wherein the amine oxides are added in an amount of from 0.02 to 1 wt % based on the weight of the aqueous phase.

* * * * *